(12) United States Patent
Delfyett et al.

(10) Patent No.: US 7,492,795 B1
(45) Date of Patent: Feb. 17, 2009

(54) ULTRALOW NOISE MODE-LOCKED LASER AND RF SINEWAVE SOURCE

(75) Inventors: Peter J Delfyett, Orlando, FL (US); Sangyoun Gee, Orlando, FL (US); Myoung-Taek Choi, Arlington, TX (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 410 days.

(21) Appl. No.: 11/029,974

(22) Filed: Jan. 5, 2005

Related U.S. Application Data

(60) Provisional application No. 60/534,435, filed on Jan. 6, 2004.

(51) Int. Cl.
*H01S 3/13* (2006.01)

(52) U.S. Cl. .............. 372/29.011; 372/29.02; 372/30; 372/18; 372/25; 372/26; 372/94

(58) Field of Classification Search ........... 372/29.011
See application file for complete search history.

(56) References Cited

U.S. PATENT DOCUMENTS

| | | | |
|---|---|---|---|
| 5,590,142 A * | 12/1996 | Shan | 372/18 |
| 5,646,774 A * | 7/1997 | Takara et al. | 359/340 |
| 5,723,856 A | 3/1998 | Yao et al. | 250/227.11 |
| 5,777,778 A | 7/1998 | Yao | 359/245 |
| 5,929,430 A | 7/1999 | Yao et al. | 250/205 |
| 6,333,942 B1 * | 12/2001 | Nakazawa et al. | 372/25 |
| 6,567,436 B1 * | 5/2003 | Yao et al. | 372/32 |
| 6,671,298 B1 * | 12/2003 | Delfyett et al. | 372/26 |
| 6,735,229 B1 * | 5/2004 | Delfyett et al. | 372/38.08 |
| 6,738,408 B2 * | 5/2004 | Abedin | 372/94 |
| 6,972,887 B2 * | 12/2005 | Wickham et al. | 359/237 |
| 2003/0160148 A1 | 8/2003 | Yao et al. | 250/205 |
| 2004/0190907 A1 * | 9/2004 | Litvin | 398/149 |

* cited by examiner

*Primary Examiner*—Minsun Harvey
*Assistant Examiner*—Joshua King
(74) *Attorney, Agent, or Firm*—Brian S. Steinberger; Phyllis K. Wood; Law Offices of Brian S. Steinberger, P.A.

(57) ABSTRACT

Systems, devices and methods of generating both a precision electrical timing signal as well as a precision optical timing signal. A novel, modified opto-electronic loop oscillator is used to drive a harmonic mode-locked laser. A novel opto-electronic loop has a larger "Q" factor by increasing the electrical loop oscillating frequency $\omega_0$ by using a beat note created by the selection of two optical longitudinal modes from the mode-locked laser. The beat note is detected and divided down to drive a modulator that mode-locks the laser. The frequency division stage also reduces the noise.

9 Claims, 9 Drawing Sheets

$F_{mod} = nc/L$
$= 10GHz$

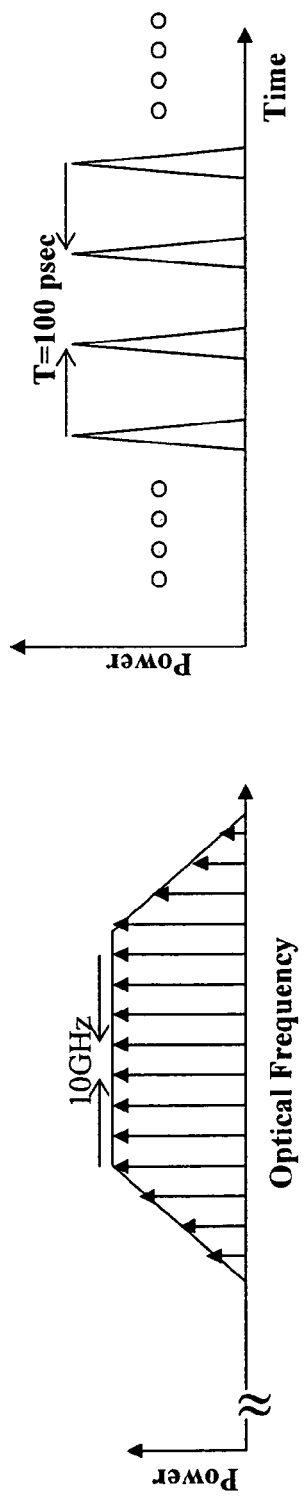
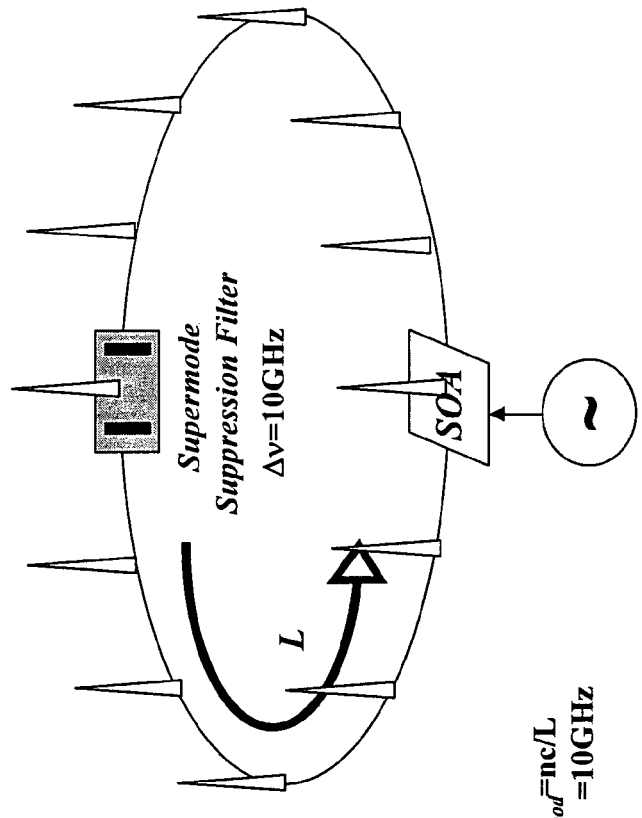
Figure 3A
Figure 3B
Figure 3C

*Cavity Mode Spectrum & Etalon Transmission Function*

*Cavity Mode Spectrum w FPE Filtering
Narrow Linewidth and Wide Mode Spacing*

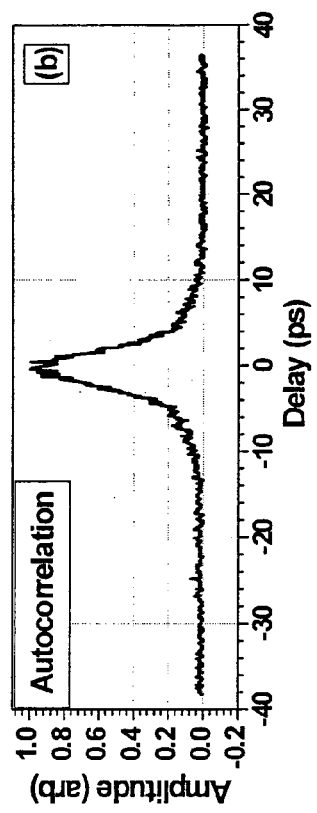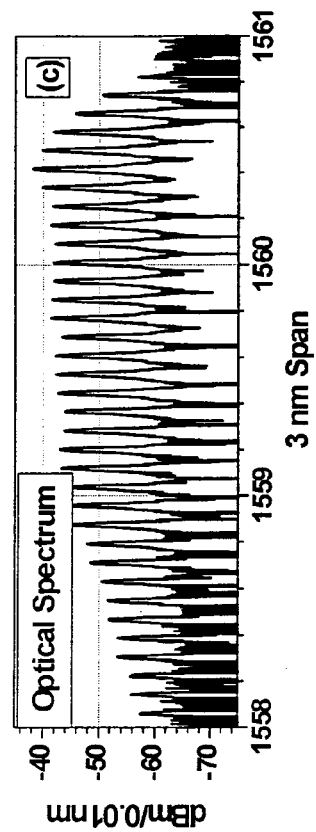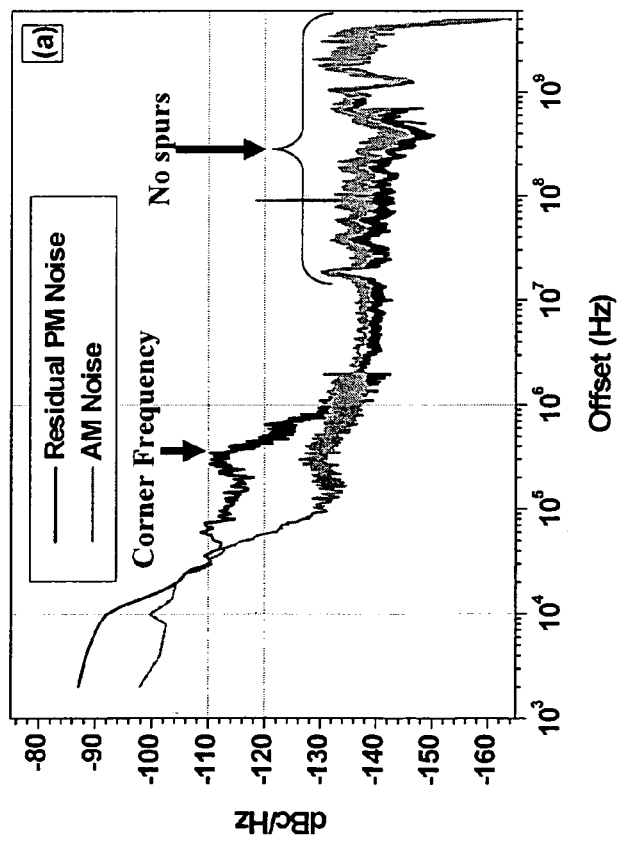
Figure 7A
Figure 7B
Figure 7C 12.5 GHz fundamentally modelocked optical spectrum

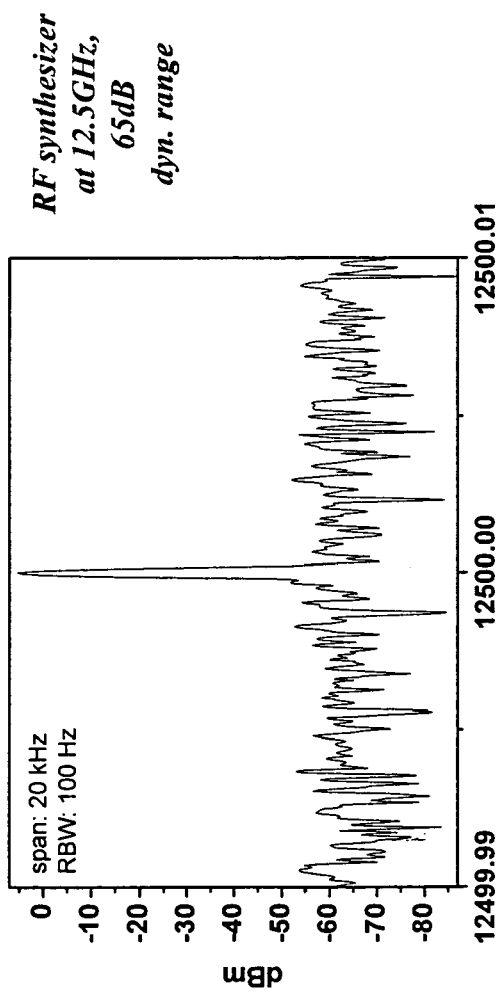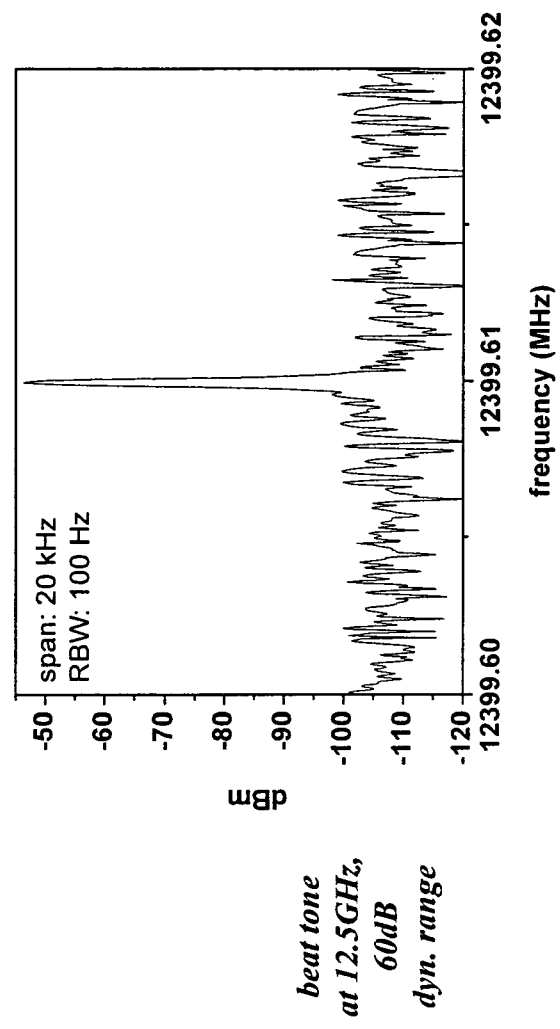
Figure 10A
Figure 10B beat tone at 37GHz, 52dB dyn. range beat tone at 25GHz, 60dB dyn. range

ULTRALOW NOISE MODE-LOCKED LASER AND RF SINEWAVE SOURCE

This invention claims the benefit of priority to U.S. Provisional Patent Application Ser. No. 60/534,435 filed Jan. 6, 2004.

FIELD OF INVENTION

This invention relates to generating timing signals and, more specifically, in particular to methods, devices and system for using opto-electronic oscillators for the generation of precision timing signals in laser type sources for applications such as computer systems, satellite and navigation systems, and guidance and control systems.

BACKGROUND AND PRIOR ART

Electronic oscillators used to generate precision timing signals are pervasive in virtually every application of electronic devices, instruments, and systems. Despite widespread use, electronic oscillators are relatively noisy and lack adequate stability for applications that require very high stability and spectral purity.

Additionally, the prior art oscillators also has problems such as limited "quality factor" or Q that are not overcome.

Opto-electronic oscillators can convert light energy into stable and spectrally pure microwave signals, but fail to overcome all the problems of the prior art.

See for example, U.S. Pat. No. 5,723,856 to Yao et al.; U.S. Pat. No. 5,777,778 to Yao; U.S. Pat. No. 5,929,430 to Yao et al.; U.S. Pat. No. 6,567,436 to Yao et al.; and U.S. Pat. App. No. 2003/0160148.

Thus, it would be desirable to overcome the deficiencies of the prior art.

SUMMARY OF THE INVENTION

A primary objective of the present invention is to provide methods, devices and systems for generating a precise electrical timing signal that does not require an RF synthesizer or frequency multiplication.

A secondary objective of the present invention is to provide methods, devices and systems for generating a precise optical timing signal that does not require a separate pumping laser or microwave source.

A third objective of the present invention is to provide a self-starting mode-locked laser opto-electronic oscillator for generating precise optical and electrical timing signals.

A fourth objective of the present invention is to provide a set of phase locked coherent optical frequencies on a periodic frequency grid.

The invention produces both a precision electrical timing signal as well as a precision optical timing signal. The invention relies on an opto-electronic loop oscillator that drives a harmonic mode-locked laser. The new opto-electronic loop has a larger "Q" factor by increasing the electrical loop oscillating frequency $\omega_0$ by using a beat note created by the selection of two optical longitudinal modes from the mode-locked laser. The beat note can be detected and divided down to drive a modulator that mode-locks the laser.

Preferred embodiments of the invention demonstrate the operation of an opto-electronic loop oscillator (OEO) that can use the longitudinal modes of an approximately 12.5 GHz harmonically mode-locked laser. Key attributes of the OEO are that it can generate high quality microwave and optical timing signals with low noise in contrast to conventional frequency synthesizers that require a frequency source and multiplication.

A preferred method of generating precise optical timing signals from a laser source can include producing a periodic comb of phase-locked longitudinal modes from a laser source, selecting two of said phase-locked longitudinal modes from said laser source, producing a beat mode from said selected two phase-locked longitudinal modes, detecting said beat mode pulses and generating an electrical beat pulse, dividing said electrical beat pulses mode by a selected integer to form a electrical controlling signal, controlling an optical modulator with said electrical controlling signal whereby said laser source is locked on a selected harmonic of the fundamental frequency of said laser source coupling said harmonic of said laser source to an output as an optical timing signal.

The method can further include the steps of suppressing the supermode noise of the harmonically mode-locked laser source, filtering the divided electrical beat pulses, and providing a Fabry-Perot Etalon as the filter.

An opto-electronic device can include a ring laser having an optical feedback loop responsive to an electrical modulation signal, said ring laser operating to produce coherent optical oscillation, and an opto-electronic feedback loop, receiving an optical signal indicative of said optical oscillation and converting said optical signal into said electrical modulation signal having a relation with said optical oscillation, said electrical modulation signal causing an optical modulation in said optical oscillation in said laser.

The optical modulation can be in phase with said optical oscillation in said ring laser causes mode-locking of said optical oscillation in said ring laser at a selected harmonic frequency that is a multiple of the fundamental frequency of said ring laser, and can include a Fabry-Perot Etalon whereby said optical oscillation is filtered to two longitudinal modes.

The optical feedback loop can include an optical coupler disposed relative to said ring laser, said optical coupler operable to split an output of said laser into a first portion as laser output and a second portion as a timing signal, and an optical filter disposed relative to said ring laser, said optical filter operable to pass selected longitudinal modes of said ring laser to said opto-electronic feedback loop.

The opto-electronic feedback loop can include a photo detector responsive to said optical signal, said photo detector deployed relative to said ring laser and operable to convert said optical signal into said electrical modulation signal, and an electrical divider circuit operable to perform a mathematical division on the output of said photo detector and produce said electrical modulation signal.

The opto-electronic feedback loop can include a microwave coupler, said microwave coupler operable to split an output of said electrical modulation signal into a first portion as opto-electronic feedback loop output and a second portion as an electrical timing signal.

A method of generating precise microwave timing signals from a laser source can include producing a periodic comb of phase-locked longitudinal modes from a laser source, selecting two of said phase-locked longitudinal modes from said laser source, producing a beat mode from said selected two phase-locked longitudinal modes, detecting said beat mode pulses and generating an electrical beat pulse, dividing said electrical beat pulses mode by a selected integer to form an electrical controlling signal, controlling an optical modulator with the said electrical controlling signal whereby said laser source is locked on a selected harmonic of the fundamental frequency of the laser source and coupling said electrical controlling signal to an output as a microwave timing signal.

The method can include suppressing the supermode noise of the harmonically mode-locked laser source, filtering the divided electrical beat pulses, and providing a Fabry-Perot Etalon as the filter.

A method and device of generating precise optical timing signals for a modelocked laser can include generating a beat pulse signal from a laser source, modifying the beat pulse signal into a drive timing signal, and modulating the laser source with the drive timing signal so that the laser source is modelocked to a selected harmonic of a fundamental frequency of the laser source.

Further objects and advantages of this invention will be apparent from the following detailed description of the presently preferred embodiments that are illustrated schematically in the accompanying drawings.

BRIEF DESCRIPTION OF THE FIGURES

FIG. 3a shows the optical spectrum for the optical loop of the opto-electronic oscillator mode-locked at a harmonic frequency with a supermode suppression filter.

FIG. 3b shows the time domain representation of the laser pulse for the optical loop of the opto-electronic oscillator mode-locked at a harmonic frequency with a supermode suppression filter.

FIG. 3c shows a representation of the pulse train around the optical loop of the opto-electronic oscillator mode-locked at a harmonic frequency with a supermode suppression filter.

FIG. 7a shows the AM and PM Noise for the low noise harmonically mode-locked semiconductor optical clock.

FIG. 7b shows the autocorrelation for the low noise harmonically mode-locked semiconductor optical clock.

FIG. 7c shows the optical spectrum for the low noise harmonically mode-locked semiconductor optical clock.

FIG. 10a shows the optical spectrum of the 12.5 GHz source for the photonic synthesize.

FIG. 10b shows the optical spectrum of the photonic synthesizer with a beat tone at approximately 12.4 GHz.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
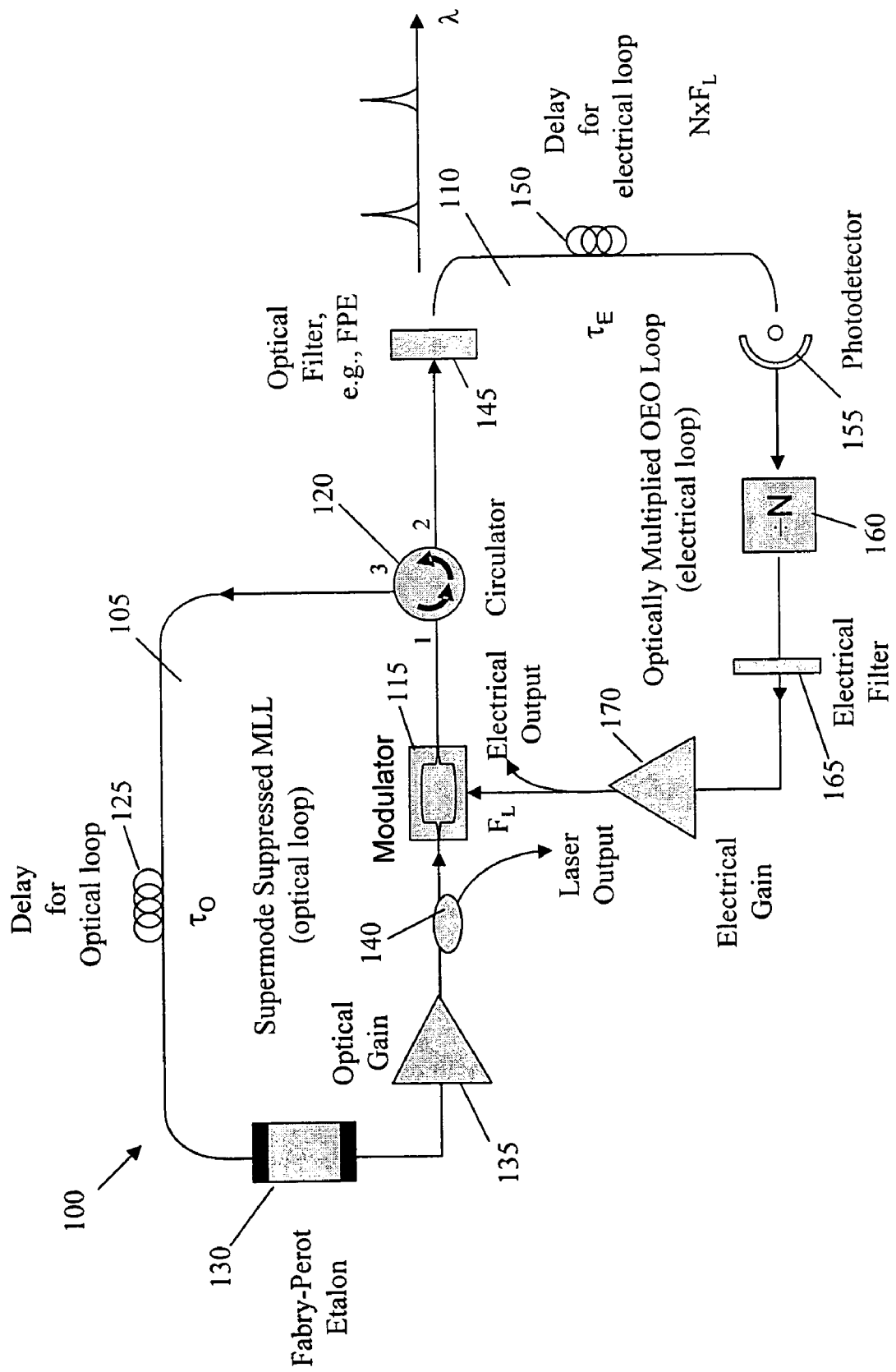
FIG. 1 shows the general schematic for the ultralow noise mode-locked laser and RF sinewave source.

A preferred embodiment of the novel ultra-low noise mode-locked laser and RF sinewave source 100 is shown in FIG. 1. The optical loop 105 of the opto-electronic oscillator 100 forms an optical ring laser and is comprised of modulator 115, optical circulator 120, optical delay 125, Fabry-Perot Etalon 130, optical gain 135, and optical coupler 140. Optical gain 135 can be a device such as a semiconductor optical amplifier (SOA) or an erbium-doped fiber amplifier (EDFA). The modulator 115 can be a LiNbO$_3$ Mach-Zehnder modulator or similar. Optical delay 125 can be a spool of fiber of approximately 100 meters in length. The electrical loop 110 of the opto-electronic oscillator 100 is comprised of modulator 115, optical circulator 120, optical filter 145, optical delay 150, photo detector 155, electrical divider 160, electrical filter 165, and amplifier 170. Optical filter 145 can be a Fabry-Perot Etalon, a WDM filter, such as Essex hyperfine WDM 16-channel mux/demux or similar. Optical delay 150 can be a spool of fiber of approximately 100 meters in length. Photo detector 155 can be an Indium Phosphate photo detector. Electrical divider 160 can be a Poseidon Scientific Instruments low noise regenerative divider. Electrical filter 165 can be a microwave bandpass filter. Amplifier 170 can be a microwave amplifier with a microwave coupler to provide the RF sinewave output from opto-electronic oscillator 100.

The Optoelectronic oscillator operates as follows: The laser oscillator and RF electrical oscillator are coupled, in that the laser produces an optical signal that initiates the production of an electrical signal. The resulting electrical is then feedback to drive the laser oscillator in resonance. This produces a more powerful and less noisy optical signal, which then produces a higher power and less noisy electrical signal, which again drives the laser. This process continues until the generation process limits itself.

IT should be noted that the ring oscillator is self starting, i.e., the process builds up from background noise in both the optical loop, as well as the electrical loop.

The delay time of the optical loop as it relates to the electrical loop can be made to be shorter, longer, or equal to the delay of the electrical loop.

The modulator frequency applied to the laser oscillator should be an integral multiple of optical cavity fundamental longitudinal mode spacing frequency The Fabry-Perot etalon provides suppression of supermode noise, by filtering or selecting a single longitudinal mode group from the harmonically modelocked laser. The resulting optical spectrum then has a mode spacing determined by the free spectral range of the etalon, but the linewidth of the individual components of the longitudinal modes have a width related to the fundamental longitudinal mode spacing.

The invention produces both a precision electrical timing signal as well as a precision optical timing signal. The idea relies on a new, modified opto-electronic loop oscillator that drives a harmonic mode-locked laser. The new opto-electronic loop has a larger "Q" factor by increasing the electrical loop oscillating frequency $\omega_0$ by using a beat note created by the selection of two optical longitudinal modes from the mode-locked laser. The beat note is detected and divided down to drive a modulator that mode-locks the laser. The frequency division stage also reduces the noise.

Figure 2B:
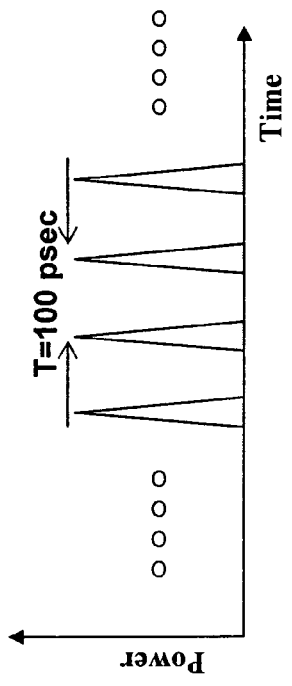
FIG. 2b shows the time domain representation of the laser pulse for the optical loop of the opto-electronic oscillator mode-locked at a harmonic cavity frequency.
Figure 2A:
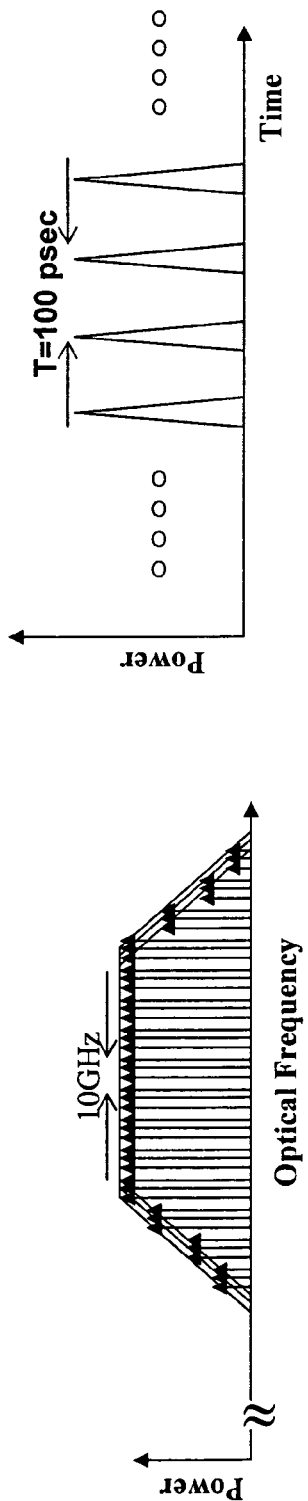
FIG. 2a shows the optical spectrum for the optical loop of the opto-electronic oscillator mode-locked at a harmonic cavity frequency.
Figure 2C:
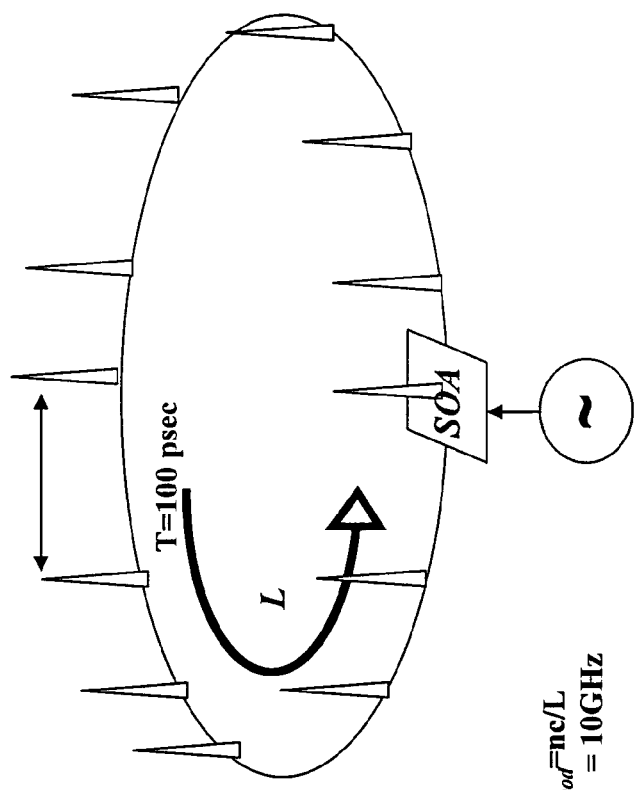
FIG. 2c shows a representation of the pulse train around the optical loop of the opto-electronic oscillator mode-locked at a harmonic cavity frequency.

FIGS. 2a-2c show various characteristics of the optical loop of the opto-electronic oscillator 100 without the filtering of the Fabry-Perot Etalon 130. FIG. 2a shows the optical spectrum for the optical loop 105 of the opto-electronic oscillator 100 mode-locked at a harmonic cavity frequency. FIG. 2b shows the time domain representation of the laser pulse for the optical loop 105 of the opto-electronic oscillator 100 mode-locked at a harmonic cavity frequency. FIG. 2c shows a representation of the pulse train around the optical loop 105 of the opto-electronic oscillator 100 mode-locked at a harmonic cavity frequency.

In FIG. 3C, the pulse rate is erratic, and is referred to as a timing jitter.

FIGS. 3a-3c show various characteristics of the optical loop of the opto-electronic oscillator 100 incorporating the Fabry-Perot Etalon 130. FIG. 3a shows the optical spectrum for the optical loop 105 of the opto-electronic oscillator 100 mode-locked at a harmonic frequency with a supermode suppression filter. FIG. 3b shows the time domain representation of the laser pulse for the optical loop 105 of the opto-electronic oscillator 100 mode-locked at a harmonic frequency with a supermode suppression filter. FIG. 3c shows a representation of the pulse train around the optical loop 105 of the opto-electronic oscillator 100 mode-locked at a harmonic frequency with a supermode suppression filter.

Figure 4:
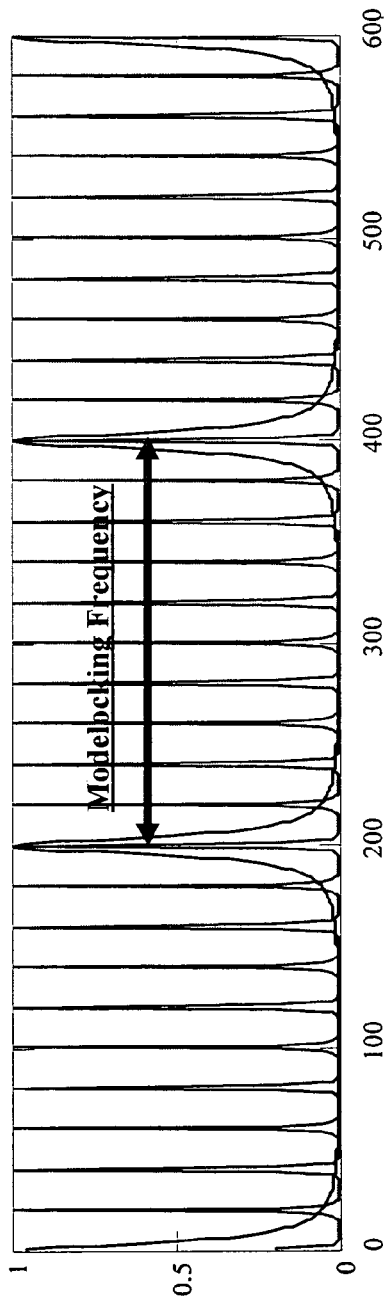
FIG. 4 shows the cavity mode and etalon transmission function.
Figure 5:
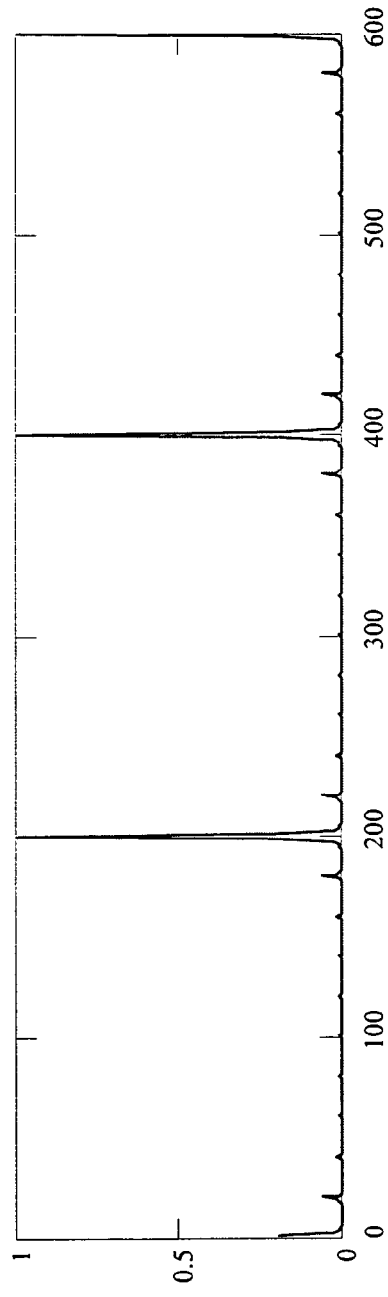
FIG. 5 shows the cavity mode spectrum with Fabry-Perot Etalon filtering.

For FIGS. 4 & 5 the vertical axis is "Transmission" and the horizontal axis is "Frequency"

FIG. 4 displays the optical spectrum of the harmonically mode-locked laser of the opto-electronic oscillator with the mode-locking frequency of 200. FIG. 5 shows the effect of the Fabry Perot Etalon 130 filtering within the optical loop of the novel opto-electronic oscillator. Modes are present at 200 and 400 demonstrating narrow line-width and wide mode spacing of the subject invention.

Figure 6:
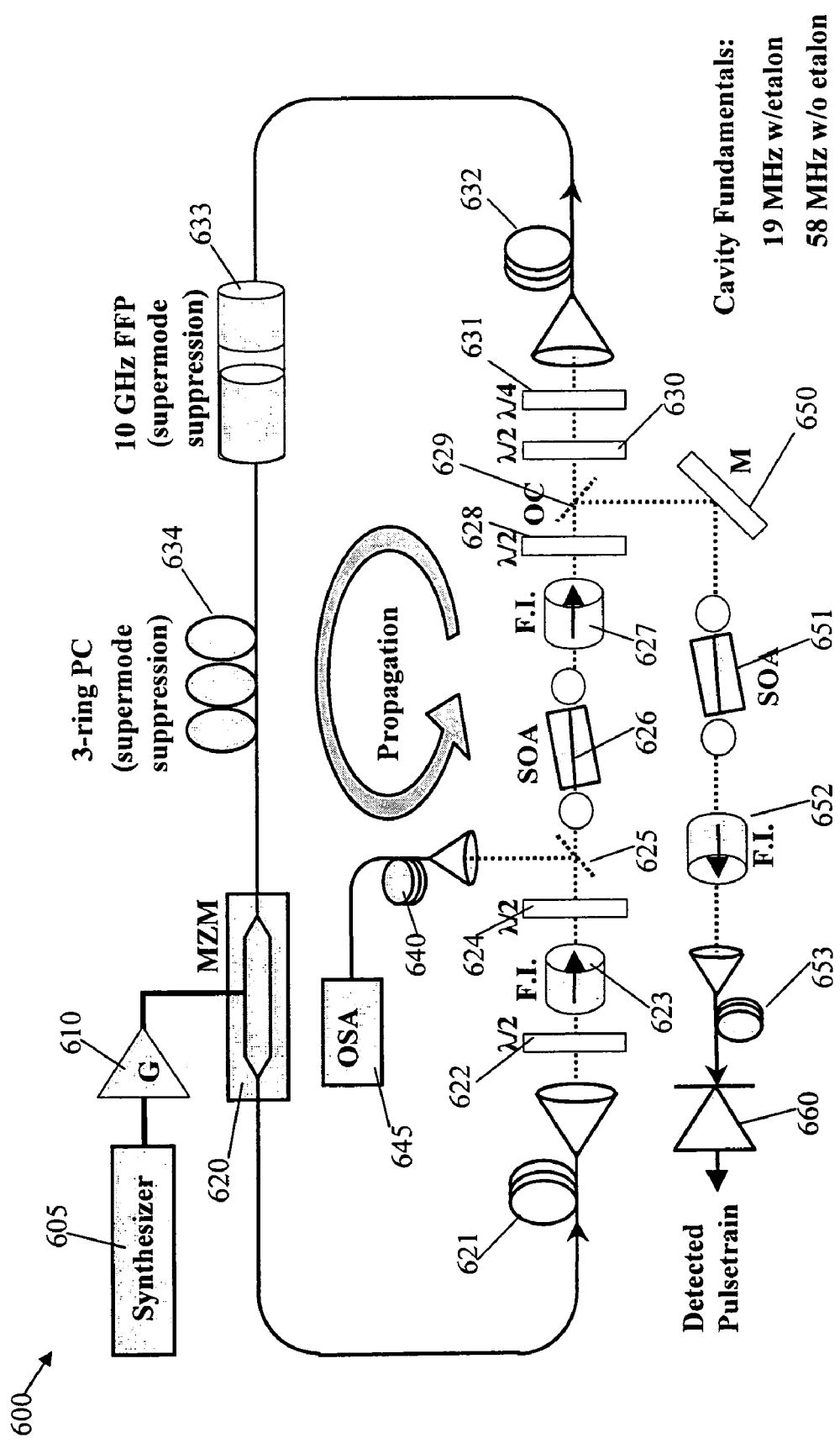
FIG. 6 shows the general schematic of the experimental setup for a low noise mode-locked semiconductor optical clock.

FIGS. 6 to 7c provide experimental evidence of the extensive supermode suppression and low pulse-train noise of the harmonically mode-locked semiconductor optical clock of the present invention. FIG. 6 is a schematic representation of the experimental setup for the low noise mode-locked semiconductor optical clock incorporating a mode suppression filter as further described in C. M. DePriest, Tolga Yilmaz, and P. J. Delfyett, Jr. "Ultralow Noise and Supermode Suppression for High Speed Photonic Sampling with a Semiconductor Diode Ring Laser", *OSA Trends in Optics and Photonics (TOPS)* Vol. 73, Conference on Lasers and Electro-Optics, pp 606-607 and incorporated here by reference. The free-space section of the laser geometry contains extensive isolation and polarization optics surrounding the semiconductor optical amplifier (SOA) 626 which can be an InGaAsP SOA. For supermode suppression, a Fiber Fabry-Perot (FFP) filter 633, with a Finesse of approximately 180 and a Free Spectral Range (FSR) of approximately 10 GHz, and a 3-ring polarization controller (PC) 634 are inserted before the Mach-Zehnder modulator (MZM) 620. The experimental setup 600 can include an RF synthesizer 605, amplifier 610, optical delay 621, 632, half-wavelength plate ($\lambda/2$) 622, 624, 628, 630, quarter-wavelength ($\lambda/4$) plate 631, faraday isolator (FI) 623, 627, output coupler (OC) 625, 629, optical spectrum analyzer (OSA) 645, and mirror (M) 650. Following amplification with a second SOA 651, the pulse-train is launched into faraday isolator 652, optical delay 653, and a high speed fiberized detector 660 in order to perform amplitude (AM) and residual phase (PM) noise measurements. Fundamental cavity frequencies with and without the etalon components are 19 MHz and 58 MHz, respectively. Components 621, 632, 653 represent optical fiber path (showing delay).

FIGS. 7a, 7b, and 7c show the characteristics of the low noise actively mode-locked semiconductor optical clock with harmonic mode-locking and with supermode noise suppression.

FIG. 7a shows the 10 GHz etalon's effects 633 on the AM and residual PM noise sidebands as well as the pulse autocorrelation in FIG. 7b and mode-locked spectrum in FIG. 7c. In addition to achieving 3.5 ps pulsewidths with well-defined optical modes, the supermode noise has been suppressed below the white noise floor while the knee remains at a relatively low frequency offset. The harmonically mode-locked laser with supermode noise suppression displays a close in knee for residual PM noise and no supermode noise spurs for amplitude (AM) and residual phase (PM) noise. Jitter is 35 fsec. and AM noise is 0.05% in the region from 10 Hz to 10 MHz.

Figure 8:
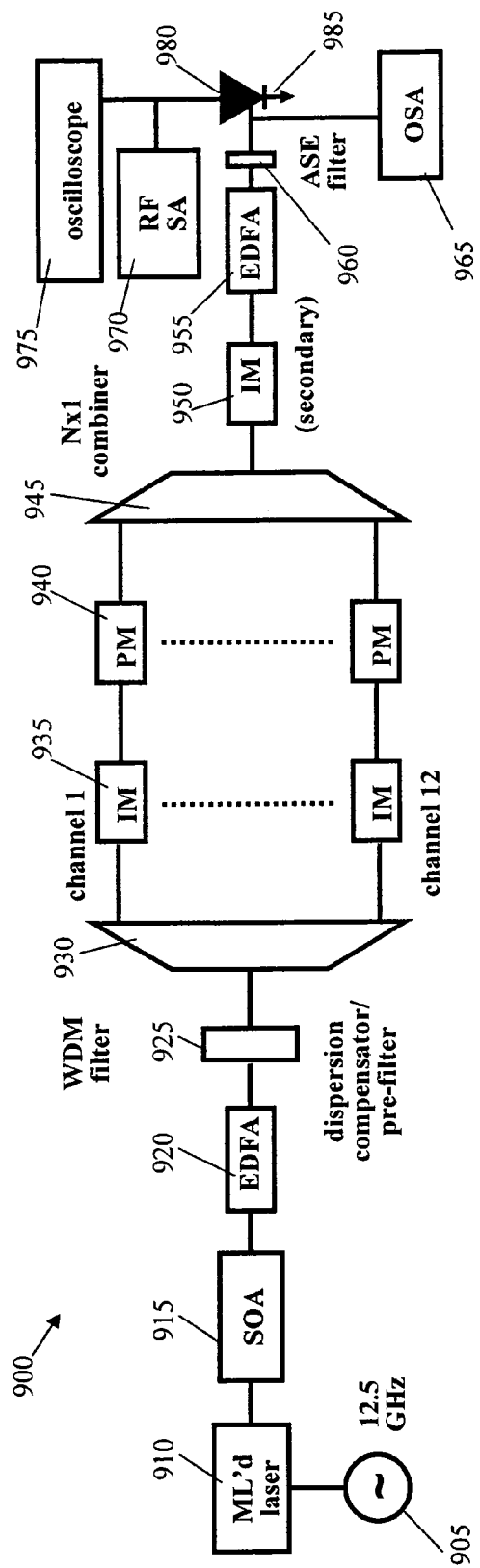
FIG. 8 is a general schematic of the experimental setup for the photonic arbitrary waveform generator.

Experimental evidence of two mode beating is provided in FIGS. 8 to 10d. FIG. 8 shows the general schematic for the Photonic Arbitrary Waveform Generator (PAWG)/photonic microwave synthesizer as disclosed in U.S. Pat. No. 6,671, 298 by Delfyett et. al. and incorporated herein by reference. A photonic arbitrary waveform generator/photonic RF synthesizer general setup can include an approximately 12.5 GHz RF source 905, a mode-locked laser 910, SOA (semiconductor optical amplifier) 915, erbium-doped fiber amplifier (EDFA) 920, dispersion compensator/pre-filter 925, WDM (waveform demultiplexing filter) 930, and separate channels (1-12 shown) that each can include an IM (intensity modulator) 935, PM (phase modulator) 940, N.times.1 Combiner 945, secondary IM (intensity modulator) 950, EDFA 955, ASE (amplified spontaneous emission) filter 960, that feeds to an OSA (optical spectrum analyzer) 965, and RF SA (RF spectrum analyzer) 970, oscilloscope 975, photo detector 980, and output 985.

The laser source 905, 910 can be an external-cavity semiconductor laser hybridly mode-locked at approximately 12.4/ 12.5 GHz, emitting pulses at approximately 1550 nm.

Referring to FIG. 8, a 12-channel WDM filter 930, such as but not limited to an Essex Corp. Hyperfine WDM, with channel spacing of approximately 6.2 GHz can be used to separate mode-lock laser longitudinal modes. The channel width can be approximately 5 GHz. Every other filter channel (approximately 12.4 GHz spacing) can be used to lower the crosstalk between adjacent filtered modes. The WDM filter 930 can have a foldover period of approximately 75 GHz, i.e. for a broadband spontaneous emission input, each channel gives an output spectrum periodic at approximately 75 GHz. In order to eliminate the foldover and to select a single longitudinal mode in each channel, a dual-grating dispersion compensator having approximately 10 dB insertion loss is used as a pre-filter. See C. M. DePriest, A. Braun, J. H. Abeles, and P. J. Delfyett, Jr., "10-GHz ultra-low noise optical sampling stream from a semiconductor diode ring laser," *IEEE Photonics Technol. Lett.*, vol. 13, pp. 1109-1111, 2001; and E. B. Treacy, "Optical pulse compression with diffraction gratings," *IEEE J. Quantum Electron.*, vol. QE-5, 454, 1969. A slit placed in the Fourier plane of the dispersion compensator 925 can act as a hard-edge filter with an approximately −3-dB bandwidth of approximately 30 GHz. Each WDM filter channel (1-12) can be sent through electro-optic intensity modulators (IM) 935, such as but not limited to SDL IOAP-MOD9170-F-F-0 model having an approximately 20 GHz bandwidth, and phase modulators (PM) 940, such as but not limited to Microphotonics Integration 12005 model having an approximately 10 GHz bandwidth, to control the relative intensity and phase between the channels. The independently modulated channels can be combined by an N.times.1 combiner 945, taking care to match the polarization state of each channel. The combined channels can be directed through a secondary intensity modulation stage 950 for additional modulation.

The modulated and combined channels can be amplified 955 and directed to diagnostics comprised of an optical spectrum analyzer 965, such as but not limited to a high resolution Ando AQ6317B model having approximately 0.01 nm resolution, an approximately 40 GHz photo detector 980, such as but not limited to a New Focus 1011 model, followed by an approximately 50 GHz microwave spectrum analyzer 970, such as but not limited to a HP 8565E model, and an approximately 50 GHz sampling oscilloscope 975, such as but not limited to a Tektronix CSA 803 model.

Figure 9:
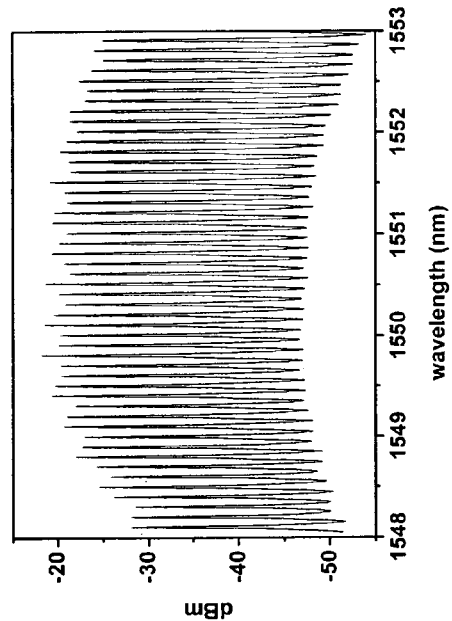
FIG. 9 shows the optical spectrum of the photonic arbitrary waveform generator.

FIG. 9 displays the 12.5 GHz fundamentally mode-locked laser optical spectrum. The modulation on the spectrum is due to the residual facet reflectivity of the semiconductor optical amplifier (SOA) 915 following the laser 910 shown in FIG. 9. The SOA 915, which was manufactured by Sarnoff Corporation, was approximately 2.3 mm in length with a saturation power of approximately 13 dBm at approximately 150 mA of bias current. The pulses from the laser are compressed from approximately 11.5 to approximately 1.5 ps (both deconvolved FWHM values assuming Gaussian shaped pulses) using the dual-grating dispersion compensator/pre-filter 925. The optical spectrum shows a longitudinal mode spacing of approximately 12.4 GHz with approximately 40 phase-locked longitudinal modes in an approximately −3-dB bandwidth.

FIGS. 10a, 10b, 10c, and 10d display the spectra showing the performance of the PAWG working as a photonic microwave synthesizer. Two longitudinal modes are selected using the WDM filter 930 (shown in FIG. 8). The two channels were recombined by a 2.times.1 combiner 45, amplified with an erbium-doped fiber amplifier (EDFA) 955, (here a Synchronous Communications, Inc. Fiber Optic Link Optical Amplifier) of approximately 16 dBm saturation power, detected using an approximately 40 GHz photo detector 980, and subsequently analyzed with a microwave spectrum analyzer 970.

Figure 10D:
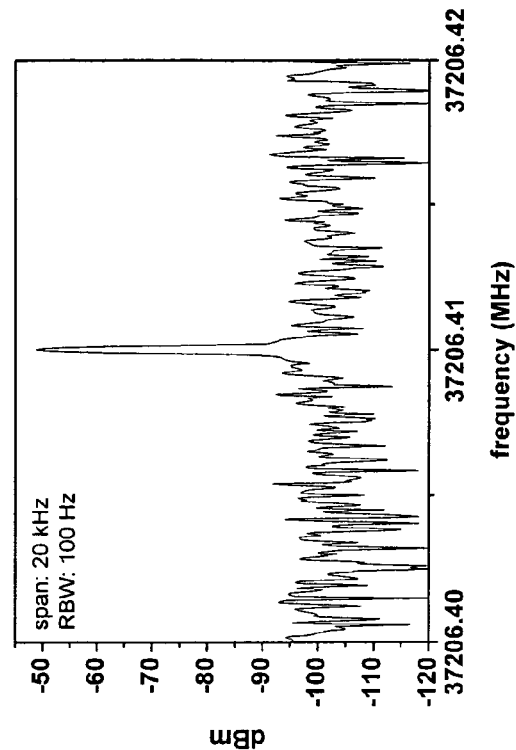
FIG. 10d shows the optical spectrum of the photonic synthesizer with a beat tone at approximately 37 GHz.
Figure 10C:
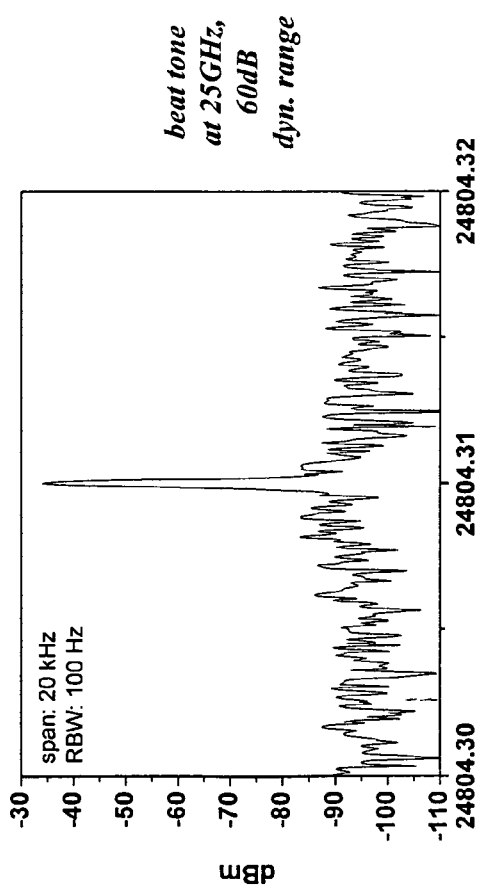
FIG. 10c shows the optical spectrum of the photonic synthesizer with a beat tone at approximately 25 GHz.

In FIGS. 10b, 10c, and 10d are the detected microwave beat notes when the selected two modes have spacings of approximately 12.4, 24.8, and 37.2 GHz, respectively. The salient feature of these photonically synthesized beat notes is their high spectral purity (linewidth<100 Hz resolution bandwidth). The phase noise on the phase-locked longitudinal modes is correlated and therefore the electrical beat signal has the linewidth of the mode-locking microwave synthesizer. For comparison, a microwave spectrum of the mode-locking signal (at approximately 12.4 GHz) from the microwave synthesizer (HP 83712B) is shown in FIG. 10a, which clearly demonstrates that there is negligible difference in noise performance between the approximately 12.5 GHz mode-locking signal and the approximately 12.4, 24.8, and 37.2 GHz photonically synthesized signals. This demonstration shows the potential of generating ultrahigh quality, high frequency photonically synthesized microwave tones in a single optical mixing step, as compared to the multiple mixing step approach in conventional microwave synthesizers.

The invention has applicability to electronic and optical communication systems, computers, navigation systems, and high speed signal processing systems and radar systems.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of generating precise optical timing signals having a frequency greater than approximately 12.4 GHz from a mode locked laser source comprising the steps of:

Automatically self-starting an optical loop of a mode locked laser source optoelectronic loop oscillator operating at greater than approximately 12.4 GHz;

Producing a periodic comb of phase-locked longitudinal modes from the mode locked laser source;

Selecting two of said phase-locked longitudinal modes from said optical loop of the mode locked laser source;

Producing a beat note from said selected two phase-locked longitudinal modes;

Delaying the produced beat note in a delay line, having a length of about 100 meters, between an optical circulator of the optical loop and a photodiode of an electrical loop said delay line coupling the electrical loop with the optical loop;

Detecting said delayed beat note pulses at the electrical loop coupled with the optical loop and generating an electrical beat pulse;

Dividing said electrical beat pulses by a selected integer to form an electrical controlling signal;

Controlling an optical modulator coupling said optical loop with said electrical loop with said electrical controlling signal to mode lock said laser source on a selected harmonic of a fundamental frequency of said optical loop; and Coupling said harmonic of said laser source to an optical output as the optical timing signal to drive a harmonic mode-locked laser.

2. The method of claim 1, further comprising the step of:
using a Fabry-Perot Etalon to suppress a supermode noise of the harmonically mode-locked laser source generated as a result of operation greater than approximately 12.4% GHz.

3. The method of claim 1, further comprising the step of:
filtering the divided electrical beat pulses.

4. A method of generating precise microwave timing signals from a self-starting mode-locked laser optoelectronic oscillator comprising the steps of:

Producing a periodic comb of phase-locked longitudinal modes from the self-starting optical loop of the mode-locked laser optoelectronic oscillator mode locked at greater than approximately 12.4 GHz Selecting two of said phase-locked longitudinal modes from said optical loop;

Producing a beat mode from said selected two phase-locked longitudinal modes;

Delaying the beat mode in a delay line, having a length of about 100 meters, between an optical circulator of the optical loop and a photodiode of an electrical loop;

Detecting said delayed beat mode pulses and generating an electrical beat pulse in the electrical loop of said optoelectronic oscillator;

Dividing said electrical beat pulses mode by a selected integer to form an electrical controlling signal;

Controlling an optical modulator coupling said optical loop with said electrical loop with the said electrical controlling signal whereby said laser is locked on a selected harmonic of the fundamental frequency of the optical loop; and Coupling said electrical controlling signal to an output as a microwave timing signal.

5. The method of claim 4, further comprising the step of:
suppressing a supermode noise of the harmonically mode-locked laser.

6. The method of claim 4, further comprising the step of filtering the divided electrical beat pulses.

7. The method of claim 5, wherein the suppressing step further includes the step of:
using a Fabry-Perot Etalon as a filter in the optical loop to suppress the supermode noise generated by the greater than 12.4 GHz operation.

8. A method of generating precise optical and electrical timing signals for a mode-locked laser and RF sinewave source comprising the steps of:

Automatically self-starting an optical loop and an electrical loop of an optoelectronic oscillator from background noise;

Generating a beat pulse signal from a laser source in an optical loop of the optoelectronic oscillator, the optical loop operating at greater than approximately 12.4 GHz;

Coupling the generated beat pulse signal from an optical circulator of said optical loop to a filter, which filters the beat pulse and couples said beat pulse into a delay line, having a length of about 100 meters, between said filter and a photodiode of the electrical loop of the optoelectronic oscillator;

The electrical loop operating at a frequency greater than approximately 12.4 GHz;

Converting the filtered and delayed beat pulse signal into an electrical drive timing signal in the electrical loop including dividing the electrical drive timing signal by an integer; and Modulating the laser source with the electrical drive timing signal so that the laser source is mode-locked to a selected harmonic of a fundamental frequency of the laser source.

9. An optical timing signal generating system for lasers comprising:

An automatically self-starting optical loop laser source for generating an optical beat pulse signal, the optical loop operating at greater than approximately 12.4 GHz;

A modifier for modifying the beat pulse signal into an electrical drive timing signal in an electrical loop coupled with the optical loop, the modifier comprising;

An optical filter for filtering the optical beat pulse signal coupled, from an optical circulator of said optical loop, into the electrical loop;

An optical delay device, including an optical delay line, having a length of about 100 meters, between said filter and a detector, of the electrical loop, for adding a delay to the filtered optical beat pulse signal;

the detector for detecting the filtered and delayed optical beat pulse signal and converting optical beat pulse signal to an electrical drive timing signal; and A modulator for modulating the laser source with the electrical drive timing signal so that the laser source is mode-locked to a selected harmonic of a fundamental frequency of the laser source.

* * * * *